United States Patent

Malikowski

[15] 3,638,334
[45] Feb. 1, 1972

[54] TRAINING GARMENT

[72] Inventor: Ethel M. Malikowski, South 150 Chestnut, Spokane, Wash. 99204

[22] Filed: July 28, 1970

[21] Appl. No.: 58,812

[52] U.S. Cl. .................................... 35/8 R, 35/56
[51] Int. Cl. .......................................... G09b 1/00
[58] Field of Search .................... 35/1, 8, 56; 2/227, 74

[56] References Cited

UNITED STATES PATENTS

| | | | |
|---|---|---|---|
| 3,493,973 | 2/1970 | Armstrong | 2/74 |
| 2,972,820 | 2/1961 | Cano | 35/56 |
| 2,501,902 | 3/1950 | Howell | 35/8 |
| 186,282 | 1/1877 | Warner | 35/56 |
| 2,703,404 | 3/1955 | Lawson | 2/227 X |
| 3,258,858 | 7/1966 | Cariffe, Jr. | 35/57 X |
| 2,313,874 | 3/1943 | Hume | 35/1 |

Primary Examiner—Robert W. Michell
Assistant Examiner—J. H. Wolff
Attorney—Wells, St. John and Roberts

[57] ABSTRACT

A training garment for assisting in teaching persons to fasten articles of clothing. A simulated vest or trouser front is provided with sensory identifying fastening elements corresponding to those found on conventional articles of clothing. Indicia such as color is used to assist in the recognition of the proper operative relationship of the fastener elements. Specifically, matching colors, buttons and buttonholes and contrasting zipper elements are provided.

2 Claims, 9 Drawing Figures

INVENTOR.
ETHEL M. MALIKOWSKI
BY
Wells, St. John & Roberts
ATTYS.

INVENTOR.
ETHEL M. MALIKOWSKI
BY
Wells, St. John & Roberts
ATTYS.

TRAINING GARMENT

BACKGROUND OF THE INVENTION

The training garments described herein are designed to assist in teaching children to fasten clothing. More specifically, they are designed for teaching the manipulation of fasteners and are adapted for use by persons with physical or mental handicaps. They have special utility in the training of persons who are mentally retarded.

The garments disclosed herein relate particularly to jackets, vests, shirts, blouses and trousers. The fastening of such garments has been found to create considerable difficulty in schools and other institutions for training those having mental or physical handicaps. Attending to the fastening of such garments for those unable to do so during or after class time requires considerable time on the part of teachers, which time could be devoted to classroom study efforts were the student able to fasten the garments for themselves. The purpose of the devices shown in the disclosure is to facilitate such training.

Prior known devices for this training purpose have only partially simulated the actual manipulation needed. Training books made of fabric are available, with pages that contain a zipper, buckle, buttons or laces, but the book format does not assist the user in relating such fastening devices to his actual clothing needs. Another such device is shown in the U.S. Pat. to Cano, No. 2,972,820, granted Feb. 28, 1961, which illustrates a panel strapped to the person and containing a multiplicity of conventional simulated fasteners. Again, their location on the body of the user has no direct relation to the location or orientation of the fastening devices on actual garments.

To meet the educational requirements of the handicapped, particularly young children, the garments disclosed herein have been developed to provide a uniform training garment suitable for classroom instruction purposes as well as for individual instruction. The garment is adjustable to various body sizes and can be used by a number of persons. Furthermore, in the case of a buttoned garment opening, progressive skills can be developed by using a series of garments developed to provide an education sequence.

SUMMARY OF THE INVENTION

The basic elements of the invention comprise a fabric panel that simulates a portion of a conventional article of apparel. The panel includes an opening which corresponds identically to a conventional opening in the article of apparel. Straps are attached to the panel for mounting it on the person of the user in a fashion identical to that assumed by the actual article of apparel. Complementary fasteners are mounted on the panel along the opening for selectively securing or releasing the opening. The fasteners include cooperative sensory indicia to assist the user in recognizing the proper operative relationship of the fasteners.

In the case of a vest, which simulates a jacket, shirt, blouse, or other article of clothing worn on the upper parts of a person and having buttons or a zipper down the front center, the panel is constructed in two separable sections. In the case of a simulated trouser front, the sections are not totally separable, and are joined to one another beneath a central zipper fly.

It is a first object of this invention to simulate the actual manipulations necessary to train persons in fastening conventional garments.

Another object of this invention is to provide a training garment of generally universal application, adjustable to meet the size requirements of individual users and adapted to be fitted in the manner of the garment simulated thereby.

Another object of this invention is to provide a training garment adapted to a sequence of training steps to progressively teach persons how to fasten buttons and buttonholes in an operational row.

Another object of this invention is to provide an imaginative training aid capable of attracting and maintaining the attention of handicapped persons, particularly persons having mental handicaps.

These and further objects and advantages will be evident from the following disclosure, taken with the accompanying drawings, which illustrate a preferred form of the invention.

DESCRIPTION OF THE PREFERRED EMBODIMENT

The training garments described herein are shown in the form of a vest (FIGS. 1–5) and a trouser front (FIGS. 6–9). Their common structural features comprise a fabric panel that simulates a portion of a conventional article of apparel, an opening on the panel, straps for mounting the panel on the person of a user, and complementary fastener means for securing or releasing the openings to duplicate the manipulation necessary on the actual article of apparel. They are designed for individual or classroom use in training children and other persons having physical or mental handicaps that impair the ability of the person to manipulate fasteners such as buttons, zippers and hooks. The fasteners are mounted on the person in the orientation and location at which they are encountered when using conventional garments, and the training afforded by use of these devices is readily transferred by the user to operation of actual articles of apparel.

Figure 1:
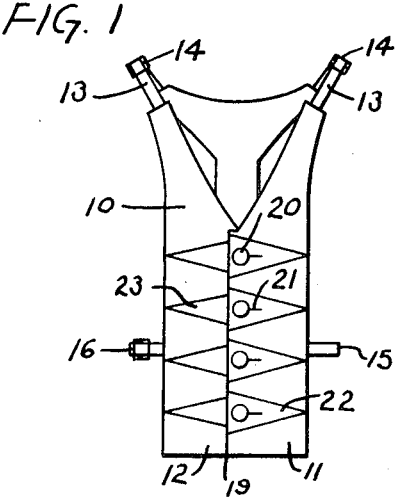
FIG. 1 is a front view of a first training vest constructed according to this invention.
Figure 2:
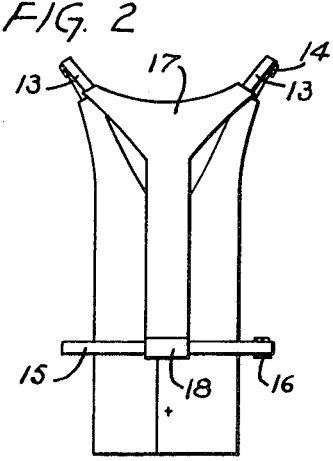
FIG. 2 is a rear view of the vest shown in FIG. 1.
Figure 3:
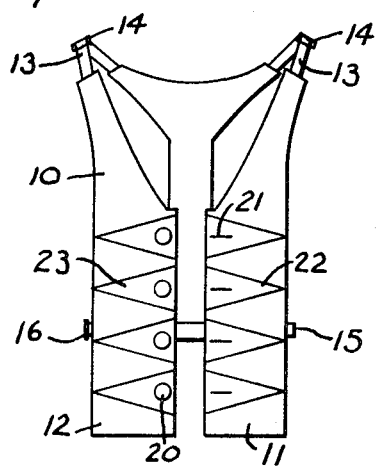
FIG. 3 is a front view of the vest shown in FIG. 1, showing the panel in separated condition.
Figure 5:
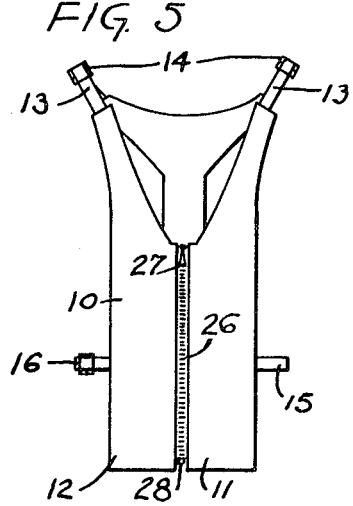
FIG. 5 is a front view of a third form of the vest.
Figure 4:
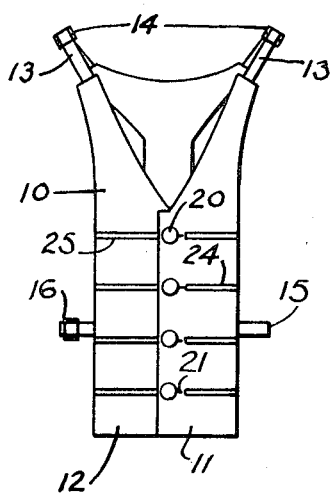
FIG. 4 is a front view of a second form of the vest.
Figure 6:
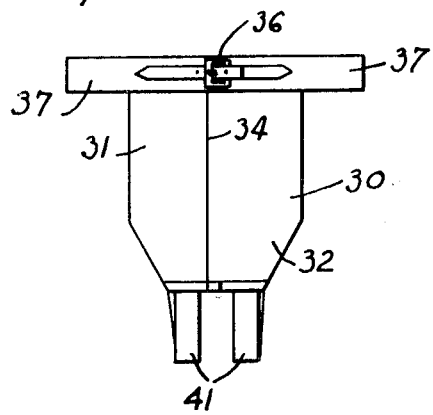
FIG. 6 is a front view of a simulated trouser front constructed according to this invention.
Figure 7:
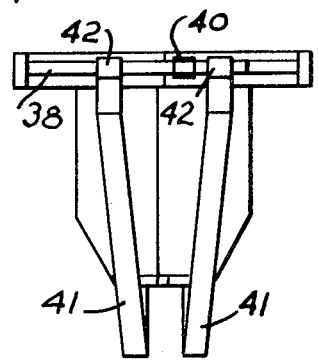
FIG. 7 is a rear view of the trouser front shown in FIG. 6.
Figure 8:
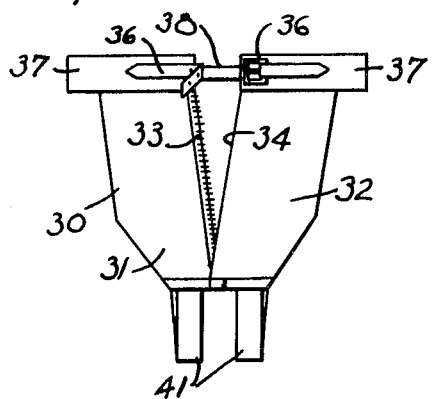
FIG. 8 is a front view of the trouser front shown in FIG. 6, being illustrated in a fully opened condition.
Figure 9:
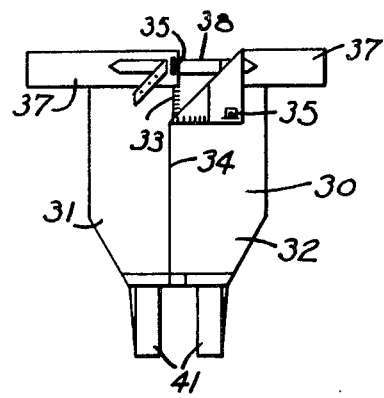
FIG. 9 is a front view of the trouser front shown in FIG. 6, illustrating it in a partially opened condition.

In the case of a vest, a primary teaching aid is illustrated in FIGS. 1–3. An alternate or secondary teaching aid is illustrated in FIG. 4. A zippered vest is illustrated in FIG. 5. The construction of these modified forms is identical, the differences between them relating to the fastener elements and identifying sensory indicia. Therefore, the same numerals will be used to identify common elements shown in these modified forms.

The vest comprises a front panel 10 formed as two separate side by side sections 11, 12. The panel 10 is adapted to be mounted on the person of the user by means of shoulder straps 13, which each include an adjustable buckle 14, and by a waist strap 15 that also includes an adjustable buckle 16. The rear of the garment comprises an upright yoke 17 of generally Y-shaped configuration made of fabric. The shoulder straps 13 are connected between the upper corners of the sections 11, 12 and the upper end of yoke 17. The waist strap 15 is loosely received through a loop 18 formed at the lower end of yoke 17. The adjustable straps 13, 15 provide size adjustment to adapt to the requirements of different users, while the yoke 17 maintains the required spatial relationship between the straps and the front panel, 10.

An opening is defined along the center of front panel 10 in the form of a fly 19 on one section 11 which overlaps the adjacent edge on the remaining section 12. Section 12 is provided with a vertical row of spaced buttons 20. The fly 19 on section 11 is provided with a corresponding vertical row of spaced buttonholes 21 adapted to complement and releasably receive the respective buttons 20.

To assist in training persons in the buttoning of garments, it has been found advisable to utilize buttons 20 of reasonably large size, so that the buttons can be more easily manipulated by small, untrained fingers or by persons having muscular handicaps. To assist in matching the proper button 20 and buttonhole 21, sensory indicia is provided on or adjacent to each button 20 and buttonhole 21. In the case of the vest shown in FIGS. 1-3, this takes the form of colored patches 22, 23 fixed to the section 11, 12 respectively adjacent each buttonhole 21 and button 20. The patches 22, 23 are color-coded, so that the user is trained to match the buttons and buttonholes adjacent patches of identical color. In addition, the buttons and buttonhole trim can be of the same color as the patches associated therewith. The patches 22, 23 provide large and readily identifiable color signals to assist handicapped persons, particularly those having poor eyesight. It has been found particularly useful to use pastel colors in the panel 10 and bright primary colors (red, blue, green and yellow) for the buttons, buttonholes and patches.

The form of the vest shown in FIG. 4 is designed for intermediate or advanced use in a progressive training program. It differs from the vest illustrated in FIGS. 1-3 in that the large color patches 22, 23 are eliminated and relatively narrow horizontal color strips 24, 25 are substituted in their places. The strips 24, 25 can be embroidered or can be alter alternatively be narrow strips of tape or other fabric material sewed in place. The strips 24, 25 are preferably arranged in the same color pattern as described above. The colors of the strips may either match the colors of the buttons or not. As an intermediate training device, the same buttons of four different colors as used in the vest shown in FIGS. 1-3 can be used along with the strips 24, 25. As a final progression, buttons of a single color, such as white, can be used with the multicolored strips 24, 25. When desired, the top button 20 can be a significantly different color than the remaining buttons, so as to assist in identifying it and beginning the buttoning process in proper sequence.

As an educational tool for a progressing sequence of training steps, a collection of three vests is preferable. The first includes the multicolored buttons and matching patches of color to provide maximum color coordination and recognition of the functional relationship existing between the buttons and buttonholes. As a second step, the same multicolored buttons are used with the multicolored matching strips. As a third step, slightly smaller buttons of a single color are used with the colored strips, the strips then serving as the sole identification, except when a special button color is used at either the top or bottom location. It has been found that after progressing through these three stages, most children are able to successfully button their own garments, and can master the necessary manipulation regardless of their handicapped condition.

The fly 19 containing the buttonholes is reversed in position between garments for male or female use. Accordingly, the training vest should be produced with both possible fly orientations, so as to properly train boys and girls in buttoning their garments.

Another type of fastener that poses difficulty to the young and handicapped is a zippered jacket or sweater. To train them to use of such garments, the vest shown in FIG. 5 has been developed. It is essentially identical to the vest illustrated in FIGS. 1-4, with the change that a zipper 26 has been substituted in place of the buttons and buttonholes. To provide color recognition, the two sides of zipper 26 are of contrasting color. As an example, one side might be white and the other black. One side might be a copper color and the other a silver color. For greater emphasis, colors such as red and yellow might be used. It is particularly helpful to use contrasting colors on the zipper pull 27 and button pin 28. The use of contrasting colors on these articles assists a teacher in identifying them in relating to the students the manner in which they are to be manipulated.

FIGS. 6-9 apply the same general principal of garment simulation to a trouser front designed to assist in teaching boys in particular to fasten trouser by themselves. The trouser front is comprised of a front panel 30. Along its center is an upright opening that extends to its upper edge and which terminates short of its lower edge. The opening defines two side sections 31, 32 which are selectively joined by a zipper 33 under a fly 34. A conventional waist hook 35 and simulated belt and buckle 36 complete the assembly at the waist of panel 30.

Panel 30 is adapted to be worn on the person by means of a waistband comprising elastic straps 37 at each side and a center adjustable strap 38 provided with a conventional adjustable buckle 40. Legbands 41 of elastic or other stretchable fabric material extend from the lower ends of the section 31, 32 and are slidably connected to the waistband by means of fabric loops 42 that loosely receive the elastic straps 37. The elastic straps 37 and 41 permit the panel 30 to be worn by persons of almost any size. The stretchable waistband band is useful in permitting users to pull the panel 30 outward from their bodies for better visibility of the operative nature of the fasteners.

The zipper components in the trouser front are preferably of contrasting color so as to assist in visual identification of them. Color can also be used on the hook elements 35 and the belt and buckle assembly 36, so as to provide interest and stimulation to the user.

The garments shown in the above disclosure are designed for classroom or individual use. They can be placed on the person in the same manner as the garments or apparel simulated thereby. They can be worn over normal clothing and may be kept on the person during extensive periods, such as through a classroom schedule. They have been found to be effective in capturing the imagination of handicapped persons and maintaining their interest as a challenge to assist themselves in fastening their clothes. Because these garments provide the fasteners on the body in a spatial relationship exactly like that found in the actual articles of apparel, the training facility gained during use of the garments is readily transferred to actual articles of clothing.

Minor changes might be made in the above garments without deviating from the basic scope of this disclosure. Therefore, only the following claims are intended as definitions of the invention disclosed herein.

Having thus described my invention, I claim:

1. In a training garment:
a fabric panel in the form of a vest adapted to simulate a conventional article of wearing apparel such as a jacket, shirt, blouse or other article of clothing worn on the upper parts of a person, including separable side by side sections each bounded along one edge by a central upright opening thereon identical in size, orientation and location to the opening conventionally included in the article of wearing apparel;
means attached to the fabric panel for mounting it upon the person of a user in the identical orientation and location assumed by the article of wearing apparel simulated thereby;
and a plurality of paired fastener means arranged on said sections adjacent said one edge thereof including complementary means for securing and releasing said sections to one another along the panel opening;
each pair of fastener means being individually identifiable by means of a color display associated therewith and distinguished from the color display of the remaining paired fastener means.

2. In a training garment defined in claim 1 wherein said fastening means comprising a row of spaced buttons on one of the sections and a corresponding row of spaced buttonholes on the other; and
in which each button and corresponding buttonhole being identifiable by color associated therewith and differing from the colors associated with the remaining buttons and corresponding buttonholes.

* * * * *